No. 661,915. Patented Nov. 13, 1900.
J. P. LEGRAND.
RESILIENT TIRE FOR WHEELS.
(Application filed May 28, 1900.)

(No Model.)

Witnesses
A. M. E. Kennedy.
G. S. Elmore.

Inventor
J. P. Legrand
By P. T. Dodge Atty

THE NORRIS PETERS CO., PHOTO-LITHO., WASHINGTON, D. C.

UNITED STATES PATENT OFFICE.

JEAN PAUL LEGRAND, OF LEVALLOIS-PERRET, FRANCE.

RESILIENT TIRE FOR WHEELS.

SPECIFICATION forming part of Letters Patent No. 661,915, dated November 13, 1900.

Application filed May 28, 1900. Serial No. 18,279. (No model.)

*To all whom it may concern:*

Be it known that I, JEAN PAUL LEGRAND, manufacturer, a citizen of the Republic of France, residing in Levallois-Perret, Seine, in the Republic of France, (whose post-office address is 9 Rue Danton, Levallois-Perret,) have invented certain new and useful Improvements in Resilient Tires for Wheels, of which the following is a specification, and for which additional patents have been applied for in France on the 31st day of January, 1900; in Belgium on the 3d day of March, 1900; in Luxemburg on the 3d day of March, 1900; in Spain on the 3d day of March, 1900, and in Italy on the 3d day of March, 1900.

This invention relates to an improved protector for resilient tires for wheels which possesses advantages not hitherto attained in the existing systems of protectors. In the systems at present employed the metallic protectors are directly in contact with the rubber of the tire, which causes a rapid wear of the latter. In my invention, on the contrary, the protective metallic casing is not in contact with the rubber of the tire, but it is fitted thereon by means of a flat band or belt having its canvas or cover quite independent of that of the tire. By this means the protective belt when fitted on the tire follows with its metallic strips the shape of the ground and not that of the tire, as is the case in most of the protective systems hitherto known in which the protective coverings of canvas, leather, iron, and the like are rigidly connected with the cover of the tire, increasing the wear and taking from it its valuable qualities of resilience and elasticity.

My invention will be clearly understood from the following description, with reference to the accompanying drawings, in which—

Figure 1:
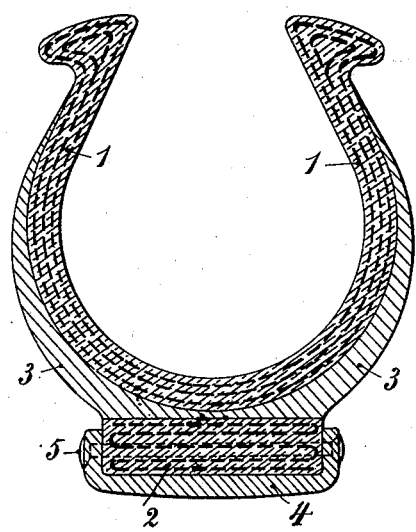
Figure 2:
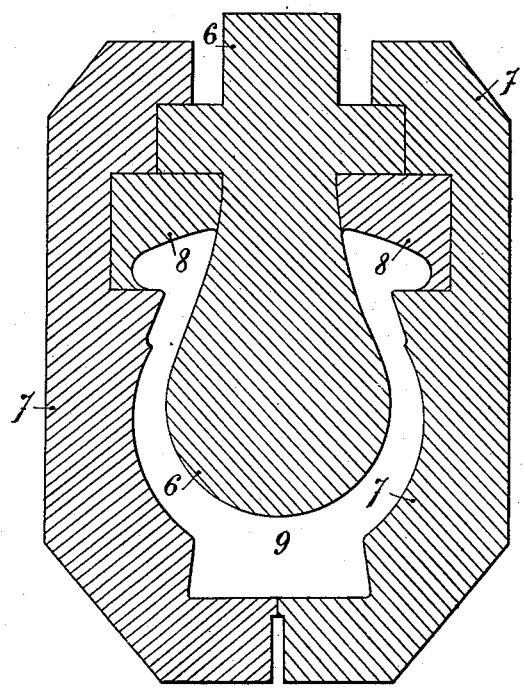
Figure 3:
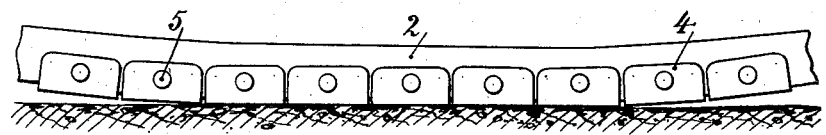
Figure 4:
Figure 5:
Figure 6:

Figure 1 is a transverse section of the cover or casing of a resilient tire provided according to my invention with a band or belt protected by strips of metal. Fig. 2 is a transverse section of a mold for preparing the cover with a protective belt according to this invention. Fig. 3 represents in side elevation a portion of the band or belt provided with its metallic strips or scales in contact with the ground. Figs. 4, 5, and 6 are transverse sections of modifications in the form of the metallic strips.

In Fig. 1, 1 represents the canvas cover of the tire, arranged, as in ordinary pneumatic tires, with thickened edges. 2 is a band or belt, with canvas arranged flat and independent of that of the tire. 3 is a covering of pure rubber attached according to the methods in use for resilient tires. 4 represents narrow metallic strips, with bent round ends engaging over the band or belt 2 and held on said belt or band by pins 5 passing through it, each metallic strip being attached separately to the belt by a separate pin.

In order to better understand how the belt or band is fitted on the tire-cover, I have shown in Fig. 2 a section of the mold which serves for the manufacture, and in this figure, 6 represents the core of the mold; 7, the shells or sides; 8, the ring to facilitate removal from the mold; 9, the moldboard or templet of the mold, giving the hollow section of the pneumatic tire with its band.

The protected band is fixed by vulcanization on the cover of the tire, because the best method that I have found for causing a band to adhere on the tread or traveling surface of a resilient tire is to vulcanize this band or belt on the cover, and it is sufficient for that purpose, as indicated in Fig. 2, to arrange the band or belt in position in the base of the two shells of the mold which serves for making an ordinary pneumatic tire.

The casing of the air-chamber is made as usual, the pieces of canvas 1 being successively placed on the core 6, Fig. 2, with the interposition of suitable thicknesses and coverings of pure rubber. The canvases of the band 2 are then placed flat upon or tangentially to the covers 1 of the casing, and the whole is placed in the mold and heated to the desired degree. In this manner the band 2, while its canvases or covers are quite independent of the tire-cover, which preserves in the latter all its inherent flexibility, is none the less solidly attached to the traveling surface or tread, the pure rubber interspersed between the canvas of the band and that of the tire being rendered quite firm and incapable of being torn off by vulcanization. This method of fixing the band by vulcanization may apply to all kinds of pneumatic tires for the reason that there is an absolute independence between the canvas of the band and that of the tire. This band might also equally well be vulcanized on the surface of the so-called "single-tube" and "wired" tires, as well as on the pneumatic tires with shoulder-pieces. The band may be applied in the same manner to solid or cushion tires in order to diminish the wear. The tire being thus protected on its external surface by the band 2, the canvas of the band would be deteriorated and would rapidly wear if the band traveled directly on the ground. In order to remove this drawback, I provide it with metallic strips 4, the edges of which are bent over the sides of the band, and through each of which separate strips a pin or spindle 5 runs, which spindles have their ends countersunk in or riveted upon the bent-over ends of the strips and serve as pivots for the strips. In this manner the band preserves all its elasticity, which is not interfered with by the metallic strips. When in contact with the ground and when the pneumatic tire is flattened, the strips may touch one another without there being any deformation of the metal by turning slightly on their axes, which serve as pivots for them, as may be seen in Fig. 3. The edges of these strips touch one another at the sides of the band, but are a slight distance apart on the tread or wearing surface.

It will be seen from Figs. 1 and 3 that the upper parts of the bent-back edges of the strips 4 are some millimeters below the interior face of the band 2, and by this means the cover of pure rubber 3 when flattened under the load does not run the risk of being cut or worn by contact with the strips. These metallic strips may be made of any suitable metal, but are preferably made of hard aluminium on account of its lightness and may have a more or less rounded strengthened or corrugated wearing-surface, as shown in Figs. 4, 5, and 6.

I declare that what I claim is—

In a protector for pneumatic tires, the combination of the tire proper provided with a comparatively thick projecting band or belt, constituting its tread, a plurality of suitable metallic strips applied side by side transversely of said band and having their ends bent to overlap the edges of the same and means for attaching said strip to said band, comprising pins or rods extending transversely through the band and through the bent overlapping ends of the strips, substantially as described.

In witness whereof I have hereunto signed my name, this 15th day of May, 1900, in the presence of two subscribing witnesses.

JEAN PAUL LEGRAND.

Witnesses:
VICTOR DE MARENDOWSKI,
AUGUSTE FOURNOL.